US008548483B2

(12) United States Patent
Phan et al.

(10) Patent No.: US 8,548,483 B2
(45) Date of Patent: Oct. 1, 2013

(54) FEEDBACK MAPPING FOR D2D CONTROL SIGNALS

(75) Inventors: Vinh V. Phan, Oulu (FI); Sami-Jukka Hakola, Kempele (FI); Timo K. Koskela, Oulu (FI)

(73) Assignee: Nokia Corporation, Espoo (FI)

( * ) Notice: Subject to any disclaimer, the term of this patent is extended or adjusted under 35 U.S.C. 154(b) by 215 days.

(21) Appl. No.: 12/924,749

(22) Filed: Oct. 4, 2010

(65) Prior Publication Data

US 2012/0083283 A1    Apr. 5, 2012

(51) Int. Cl.
*H04W 72/00*    (2009.01)
(52) U.S. Cl.
USPC ...... 455/450; 455/451; 455/452.1; 455/452.2
(58) Field of Classification Search
USPC .............................................. 455/450–452.1
See application file for complete search history.

(56) References Cited

U.S. PATENT DOCUMENTS

| | | | |
|---|---|---|---|
| 2006/0178148 A1* | 8/2006 | Du et al. ....................... | 455/445 |
| 2007/0097981 A1 | 5/2007 | Papasakellariou | |
| 2009/0005057 A1* | 1/2009 | Lee et al. ...................... | 455/450 |
| 2009/0011770 A1* | 1/2009 | Jung et al. .................. | 455/452.1 |

FOREIGN PATENT DOCUMENTS

| | | |
|---|---|---|
| EP | 2117152 A1 | 11/2009 |
| EP | 2161868 A1 | 3/2010 |
| WO | WO 2008137864 A2 | 11/2008 |
| WO | WO-2009/120843 A2 | 10/2009 |
| WO | WO 2009120888 A2 | 10/2009 |
| WO | WO-2009/138820 A1 | 11/2009 |
| WO | WO-2010/049801 A | 5/2010 |
| WO | WO-2010/082084 A1 | 7/2010 |
| WO | WO 2010097645 A1 | 9/2010 |
| WO | WO 2010110598 A2 | 9/2010 |

OTHER PUBLICATIONS

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.0.0, Jun. 2010, 39 pgs.
"Future of Wireless? The Proximate Internet", Rajiv Laroia, COMSNETS, Jan. 7, 2010, 38 pgs.
3GPP TSG-RAN-WG1 #50bis, R1-074063 Shanghai China, Oct. 8-12, 2007, Source: Huawei; Title: Relation between UL ACK/NACK and DL CCE (6 pages).

(Continued)

*Primary Examiner* — Jean Gelin
*Assistant Examiner* — Dung Hong
(74) *Attorney, Agent, or Firm* — Harrington & Smith

(57) ABSTRACT

A position of a device within a cluster of multiple devices is determined and stored in a memory. An uplink radio resource is mapped from a downlink radio resource in dependence on the determined position of the device within the cluster of multiple devices. In an embodiment the respective uplink and downlink radio resource is a PUCCH and PDCCH of a cellular network, and the cluster is a D2D network. In one embodiment the device position is an index j which is used to offset from a predetermined mapping pattern. In another embodiment the position of the device corresponds to an individual field of a transmission on the PDCCH and the mapping is in dependence on a bit value in the individual field.

20 Claims, 6 Drawing Sheets

(56) References Cited

OTHER PUBLICATIONS

3GPP TSG RAN1#50-bis, R1-074009, Shanghai China, Oct. 8-12, 2007; Source: Motorola; Title: UL ACK/NACK Implicit Mapping (2 pages).

3GPP TSG-RAN WG2# 58 Meeting, R2-071983, Kobe Japan, May 6-11, 2007; Source: NEC; Title: Discussion of eMBMS Uplink Feedback Schemes (5 pages).

* cited by examiner

| UE | UL | IMPLICIT MAPPING BY INDEX j=[0,1,2,3] | MAPPING BY DCI FIELDS/RNTI MASK |
|---|---|---|---|
| 10-1 | 15-1 | j=0, USE NORMAL (CELLULAR) PDCCH →PUCCH MAPPING | j=0, NO CORRESPONDING FIELD, USE NORMAL (CELLULAR) PDCCH →PUCCH MAPPING |
| 10-2 | 15-2 | j=1, OFFSET 1 PUCCH FROM NORMAL PDCCH →PUCCH MAPPING | j=1, MAP PUCCH USING 'MODULATION & CODING SCHEME' FIELD OF PDCCH |
| 10-3 | 15-3 | j=2, OFFSET 2 PUCCHs FROM NORMAL PDCCH →PUCCH MAPPING | j=2, MAP PUCCH USING 'NO. OF SPATIAL LAYERS' FIELD OF PDCCH |
| 10-4 | 15-4 | j=3, OFFSET 3 PUCCHs FROM NORMAL PDCCH →PUCCH MAPPING | j=3, MAP PUCCH USING 'PRECODING INFORMATION' FIELD OF PDCCH |

FIG.3

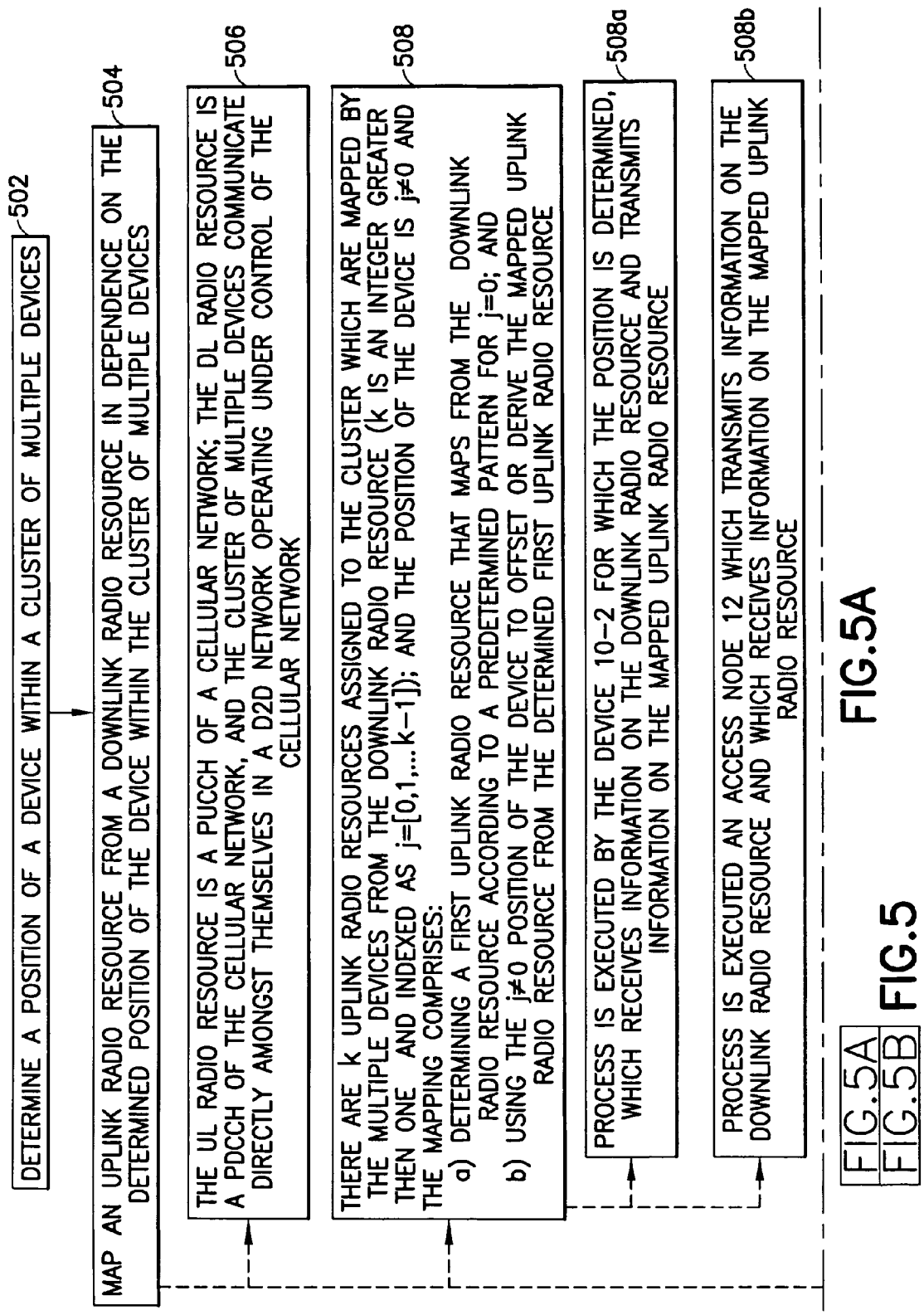

FEEDBACK MAPPING FOR D2D CONTROL SIGNALS

TECHNICAL FIELD

The exemplary and non-limiting embodiments of this invention relate generally to wireless communication systems, methods, devices and computer programs and, more specifically, relate to mapping uplink control signals from devices operating in heterogeneous networks (e.g., cellular and D2D).

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
CCE control channel element
CQI channel quality indicator
D2D device to device (sometimes termed machine to machine M2M or peer-to-peer P2P)
DL downlink (eNB towards UE)
eNB E-UTRAN Node B (evolved Node B)
E-UTRAN evolved UTRAN
HARQ hybrid automatic repeat request
LTE/LTE-A long term evolution/long term evolution-advanced
MME mobility management entity
NAS non access stratum
PDCCH physical downlink control channel
PDCP packet data convergence protocol
PDU protocol data unit
PUCCH physical uplink control channel
PUSCH physical uplink shared channel
RACH random access channel
RNTI radio network temporary identifier
SR scheduling request
UE user equipment
UL uplink (UE towards eNB)
UTRAN universal terrestrial radio access network One example of heterogeneous networks include local D2D communication networks integrated into a cellular network, and there is current research in LTE-A for this to be a deployment of macro, micro, pico and/or femto cells as well as relays in the same spectrum. By example the D2D communications may be among a cluster of devices that are autonomous or semi-autonomous within a cellular network, a grid or group of local machines communicating so as to perform certain tasks in co-operative way, an advanced device acting as a gateway for a number of other low-capability devices or machines to access the network, and co-operative downloading or multicasting within a cluster of devices. A common theme in these examples is that they each utilize a secondary usage of the cellular network for the direct device to device communications.

As with most over the air interfaces, resources are scarce and so control signaling must be done efficiently so that the control signaling overhead is not large in relation to the spectrum available for data transmissions. For a D2D cluster operating under a cellular network, there are instances when the cellular network needs to communicate with the D2D cluster. The network will need to receive control signaling from the individual devices concerning buffer status, CQI reporting, and scheduling requests. Assume for example there is some control information the network sends to the devices on the DL which the network would like to confirm was received by each device in the cluster. There are several approaches to do this.

In one option the network can send control signals to the D2D devices in separate messages, individually to each device in the D2D cluster. In this instance there is no need for the network to specify any identifier for the D2D cluster since the network treats each device as an individual. An advantage is that existing implicit resource mapping can be used for the HARQ ACK/NACK feedback signaling by the devices, in which the ACK/NACK UL resource is mapped from the DL channel on which the message being ACK'd/NACK'd was sent. A disadvantage of this option is that the same information content is transmitted on the DL once for each device in the D2D cluster, which leads to high control signaling overhead.

A second option is for the network to assign some temporary identifier to the D2D cluster and multiplex or concatenate the individual device-specific messages (packet data units PDUs) together and address the combined messages to the cluster. In this option the same control content is still transmitted once over the air interface for each separate device in the D2D cluster, but the advantage is there is no need to generate a common ciphering key to be able to send this common control message. In this option spectrum efficiency is still much less than what experience in signaling for strictly cellular concepts would suggest.

A third option is to transmit the DL control signaling for the D2D cluster in one common control message that is decipherable and decodable by all devices in the cluster. One problem with all these approaches is that the network still needs to know whether both devices received the control message correctly. For the specific implementation in a LTE cellular network, the incorporation of the D2D cluster under the LTE umbrella does not change the normal LTE algorithms, such as how PUCCH resources which are used for sending the UL HARQ ACK/NACK, CQI or SR are implicitly derived from the DL PDCCH CCE index. The existing LTE principles map only one PUCCH resource for an ACK/NACK, but there are multiple devices in the D2D cluster in this example.

Consider conventional control signaling in LTE. A PDSCH transmission from the network implicitly maps related HARQ feedback from a UE onto a specific PUCCH resource. If the UE has PUSCH resources allocated, its HARQ feedback is multiplexed into its PUSCH transmission. 3GPP TS 36.300 v 10.0.0 (2010-June) describes the process as follows. The PUCCH shall be mapped to a control channel resource in the UL. A control channel resource is defined by a code and two resource blocks, consecutive in time, with hopping at the slot boundary. Depending on presence or absence of UL timing synchronization, the UL physical control signaling can differ. In the case of time synchronization being present, the outband control signaling consists of CQI, or ACK/NACK, or a scheduling request (SR). The CQI informs the scheduler about the current channel conditions as seen by the UE. If MIMO transmission is used, the CQI includes necessary MIMO-related feedback. The HARQ feedback in response to DL data transmission consists of a single ACK/NAK bit per HARQ process. PUCCH resources for SR and CQI reporting are assigned and can be revoked through RRC signaling. An SR is not necessarily assigned to UEs acquiring synchronization through the RACH (i.e. synchronized UEs may or may not have a dedicated SR channel). PUCCH resources for SR and CQI are lost when the UE is no longer synchronized.

Clearly the normal LTE HARQ process is not readily adaptable for use with multiple devices operating in a D2D cluster, unless like the first option noted above each device is treated independent of that cluster. The detailed examples below consider how to assign and use UL control resources (e.g., PUCCH) for a group of devices (e.g., a pair or a cluster of more than two devices) involved in D2D communications under control of a cellular network (e.g., an LTE-A network).

SUMMARY

The foregoing and other problems are overcome, and other advantages are realized, by the use of the exemplary embodiments of this invention.

In a first aspect thereof the exemplary embodiments of this invention provide a method comprising: determining position of a device within a cluster of multiple devices and storing the determined position in a computer readable memory; and mapping an uplink radio resource from a downlink radio resource in dependence on the determined position of the device within the cluster of multiple devices.

In a second aspect thereof the exemplary embodiments of this invention provide a memory storing a program of computer readable instructions, that when executed by at least one processor result in actions comprising: determining position of a device within a cluster of multiple devices; and mapping an uplink radio resource from a downlink radio resource in dependence on the determined position of the device within the cluster of multiple devices.

In a third aspect thereof the exemplary embodiments of this invention provide an apparatus, comprising at least one processor and at least one memory storing computer program code. The at least one memory and the computer program code are configured, with the at least one processor, to cause the apparatus at least to: determine position of a device within a cluster of multiple devices; and map an uplink radio resource from a downlink radio resource in dependence on the determined position of the device within the cluster of multiple devices.

BRIEF DESCRIPTION OF THE DRAWINGS

FIG. 3 is a table showing two different implementations of the present invention for mapping the various UL channels at FIG. 2 from the DL channel.

DETAILED DESCRIPTION

Figure 1:
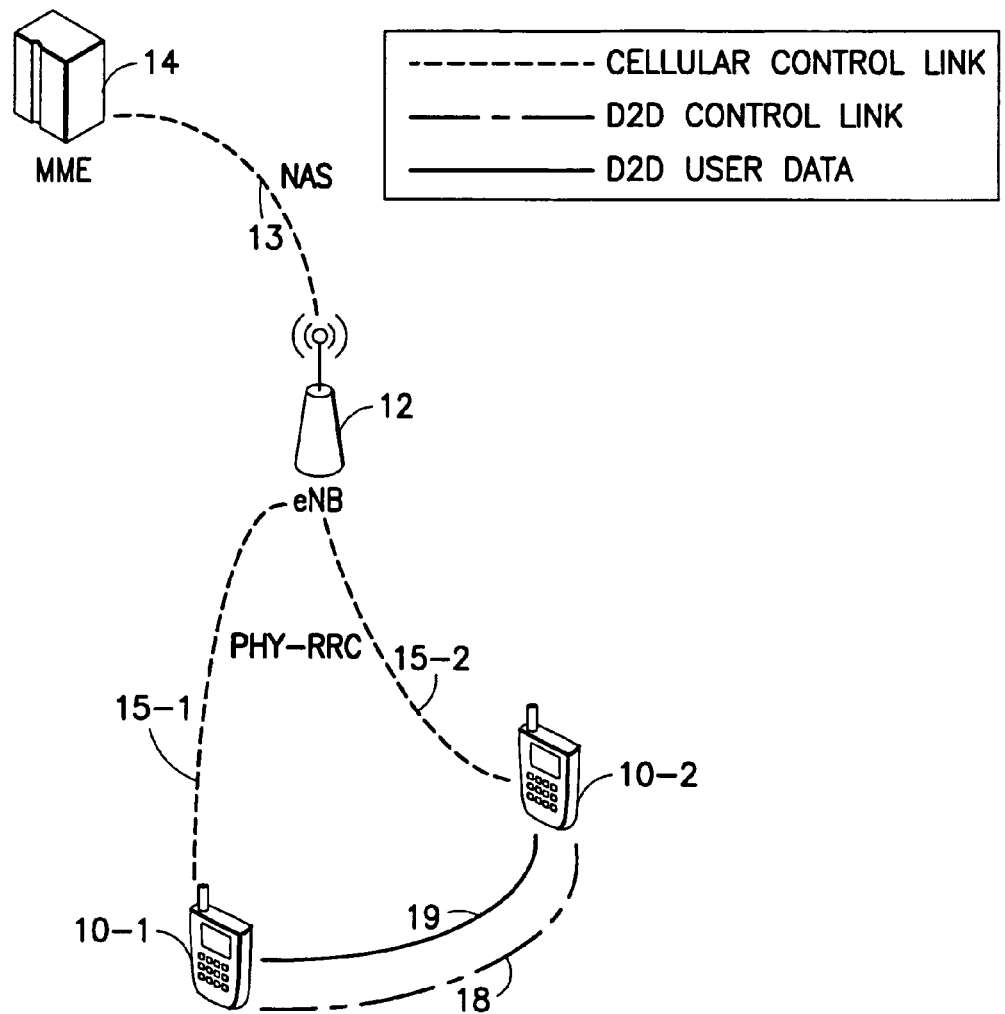
FIG. 1 illustrates various devices of heterogeneous network showing division of control plane between cellular and D2D networks, with cellular bearers' user data paths omitted.

For heterogeneous networks the control plane may be conceptualized as being in two component parts: one between the network and the D2D cluster as a whole, and the other between the D2D devices within the cluster itself. FIG. 1 illustrates this concept. The cellular network is embodied as a MME 14 and an eNB 12 serving a D2D cluster of UEs 10-1 and 10-2. Control signaling in the cellular network is along cellular control links 13 between the MME 14 and the eNB 12 which may or may not be wireline links, and also along cellular control links 15-1 and 15-2 across the air interface between the eNB 12 and the various UEs 10-1 and 10-1. The two UEs are grouped as a D2D cluster, and so the D2D communications utilize D2D control link 18 and data within the D2D cluster is transferred across the D2D user data link 19. FIG. 1 illustrates only two UEs or devices 10-1 and 10-2 in the D2D cluster though the principles detailed below are readily extended to D2D clusters with more than two devices.

The detailed examples below are in the context of the LTE system, but this is merely exemplary and the principles detailed herein are readily extended to other types of cellular networks in which the D2D cluster may operate, such as but not limited to GERAN, WCDMA, WiFi, and other hierarchical type wireless systems. The problem solved by the exemplary embodiments detailed herein is how to assign or use UL control resources (e.g., PUCCH resources) for a group, of D2D devices involved in cellular controlled D2D communications.

According to an exemplary embodiment of the invention, each device within the cluster of D2D devices has a position or rank within the cluster. This is not a geographic or chronological position but rather an allocated position used for UL channel mapping purposes. An individual device determines its position within the cluster of multiple D2D devices; stores its determined position in its local memory; and maps an uplink radio resource on which it will send its ACK/NACK/CQI from the received downlink radio resource. That mapping is in dependence on the device's determined position within the cluster of multiple D2D devices, which is stored in the local memory. The devices do this mapping in order to find which PUCCH on which to send their UL control signaling, and the eNB 12 also uses these same device positions and similar mapping to determine which PUCCHs it receives come from which of the various D2D devices. Below are two specific but non-limiting examples of that mapping, both of which are in the context of the uplink radio resource being a PUCCH of a cellular network, and the downlink radio resource being a PDCCH of the cellular network. The cluster of multiple D2D devices communicate directly amongst themselves in a D2D network which operates under control of that same cellular network. Of course they also communicate with the cellular network at least via the PUCCH and PDCCH noted above.

In one embodiment the position of the devices corresponds to an index j. By example the serving eNB signals at least the cluster head device 10-1 with a value k which specifies the number of PUCCH resources assigned to the D2D cluster. k is indexed as j=[0, 1, . . . k−1] to denote the individual $j^{th}$ positions of the individual devices. There may be more or less devices in the cluster than the value of k, but for simplicity of description assume there are exactly k devices in the cluster and k PUCCHs assigned to that cluster. Any device in the cluster may occupy any given $j^{th}$ position, but for simplicity assume that the position of the cluster head device is at position j=0 and other devices in the cluster are allocated positions j=1, j=2 and j=3. In one exemplary implementation the device at position j=0 (the cluster head device) finds its PUCCH by mapping from the received PDCCH as is normal for LTE, and the position j=0 does not change that mapping. The other devices at positions j≠0 first map as does the j=0 device to find what is conveniently termed a first PUCCH, which is the same PUCCH that the j=0 position device will use, and then offset from the first PUCCH to another PUCCH in an amount corresponding to the value of their $j^{th}$ position within the cluster. The offsets may be directly linear as in j=1 maps to the next subsequent PUCCH following the first PUCCH, or the $j^{th}$ position mapping may be less direct in that the devices in the j≠0 position use their j value to derive their PUCCH from the first PUCCH that maps from value j=0 (e.g., offset 3j PUCCHs, or offset j+1 PUCCHs).

In another embodiment the position of the devices corresponds to a DCI field in the PDCCH itself. By example the cluster head device position has no corresponding DCI field and so like the first embodiment above it finds its PUCCH by mapping from the received PDCCH as is normal for LTE, and there is no further mapping or offsetting since the cluster head device has no corresponding DCI field. All other devices in the cluster will have a corresponding DCI field, and use the bit value of their corresponding DCI field to offset or otherwise derive their PUCCH from the first PUCCH mapped by the normal LTE rules which the cluster head uses to find its own PUCCH in this example.

The devices may learn or otherwise determine their position within the D2D cluster in any number of ways. In an exemplary embodiment the cluster head informs the other devices in the cluster of their position via D2D signaling, and also informs the eNB so that the eNB can associate the various ACK/NACK/CQI information it receives on the various PUCCHs with individual ones of the D2D devices in the cluster. In another embodiment the eNB designates which individual D2D devices correspond to which $j^{th}$ index value, or to which DCI field. In this embodiment the eNB 12 can signal all the designated positions only to the cluster head device 10-1 which then informs the other devices 10-2 via D2D signaling of their respective positions, or the eNB 12 may signal each device 10-1, 10-2 directly with its position designation. As one device leaves the cluster and another joins, the cluster head or eNB may re-use the $j^{th}$ index value or DCI field formerly associated with the departing device for the newly joining device, without having to re-position every device which stays in the cluster. For the specific case in which there are only two devices in the D2D cluster, there need not be any explicit or implicit signaling of position; the cluster head device 10-1 may in an embodiment assume the default position (index j=0 or no corresponding DCI field) and the other paired D2D device 10-2 will assume the first non-default position (index j=1 or the first/default re-interpreted DCI field).

Figure 2:
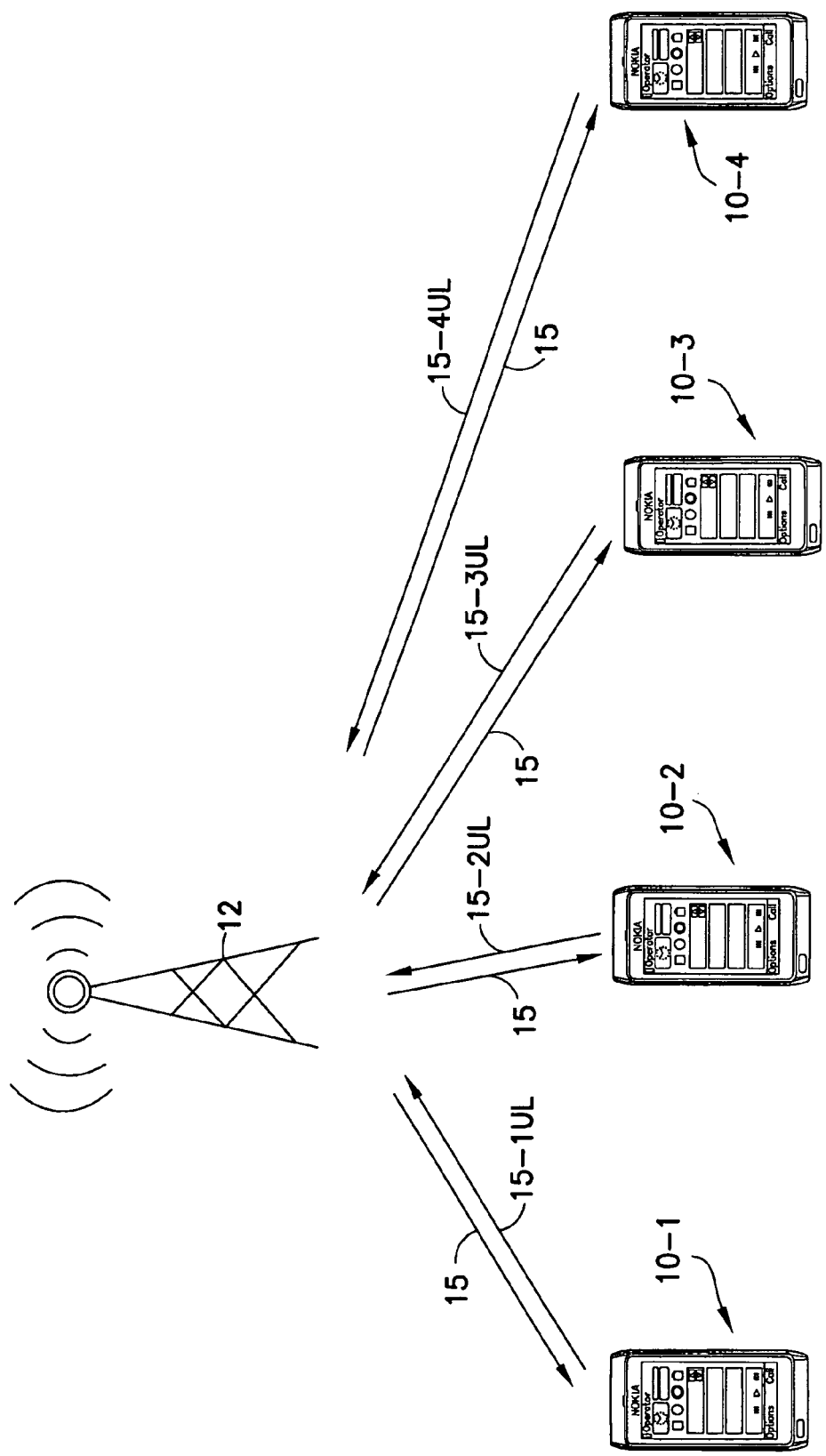
FIG. 2 is a schematic diagram showing the eNB sending a same DL message to four clustered D2D devices and each responding on a different UL channel.

These two exemplary embodiments are detailed further with respect to FIGS. 2 and 3. FIG. 2 illustrates schematically a cluster of four D2D devices 10-1, 10-2, 10-3, 10-4 in communication with an access node or eNB 12 of a cellular system. The serving eNB, instead of assigning each active user with a PUCCH channel or resource as in current E-UTRAN, configures the D2D group with one or more PUCCH resources, e.g., depending on current size of the D2D group and available PUCCH resources. As above, if there are k PUCCHs configured there may be less than k devices in the D2D cluster, in which case some of the configured PUCCHs may go unused for a time until the eNB re-configures the value of k or the size of the cluster changes to equal k. In both exemplary embodiments each of the D2D devices 10-1, 10-2, 10-3, 10-4 receives from the eNB 12 a PDCCH 15. In both exemplary embodiments each of the D2D devices 10-1, 10-2, 10-3, 10-4 maps that same received PDCCH 15 to a different PUCCH, shown at FIG. 2 as 15-1UL, 15-2UL, 15-3UL and 15-4UL respectively.

In the first exemplary embodiment the PUCCH mapping is implicit. The eNB 12 in this embodiment assigns at least the cluster head device 10-1 with a positive integer k, indexed as j=[0, 1, ... k−1] and where k is greater than one. The value of k indicates the number of PUCCH resources assigned by the eNB 12 to the cluster. An example for this implicit PUCCH mapping embodiment is shown at FIG. 3 in the column corresponding to "implicit mapping by index j".

The cluster head device 10-1 conveniently makes itself position j=0, and finds its PUCCH 15-1UL by mapping normally from the PDCCH 15 using conventional LTE rules. The value j=0 means no further offset from that normal PDCCH→PUCCH mapping. The second device 10-2 holds position j=1 in the cluster, and finds its assigned PUCCH 15-2UL by a) determining a first PUCCH by mapping PDCCH→PUCCH under normal LTE rules, and then b) offsetting j=1 PUCCH from that first PUCCH. The third device 10-3 holds position j=2 in the cluster, and finds its assigned PUCCH 15-3UL by a) determining a first PUCCH by mapping PDCCH→PUCCH under normal LTE rules, and then b) offsetting j=2 PUCCHs from that first PUCCH. And similarly the fourth device 10-4 holds position j=3 in the cluster, and finds its assigned PUCCH 15-4UL by a) determining a first PUCCH by mapping PDCCH→PUCCH under normal LTE rules, and then b) offsetting j=3 PUCCH from that first PUCCH.

From a practical perspective, this embodiment is not expected to result in PUCCH collisions with PUCCH allocations to other UEs in the cellular system since in the way that implicit mapping is handled here there will always be some "gaps" in the available PUCCH resources. The value k may be configured semi statically by the eNB 12 using a Layer 3 radio resource control message.

In the second exemplary embodiment the mapping of PDCCH to PUCCH is somewhat more direct. The PDCCH 15 carries a downlink control information message of which there are multiple fields for various purposes in conventional LTE. In this embodiment some of those fields are re-interpreted for PUCCH mapping purposes. An example for this re-interpreted DCI field embodiment is shown at FIG. 3 in the column corresponding to "mapping by DCI field". By example, the eNB 12 signals the devices that they are to use the re-interpreted meaning for those affected fields by masking the PDCCH transmission 15 with a specific RNTI or other temporary identifier which the cellular network (represented as the access node 12) has assigned to the D2D cluster. If the PDCCH is masked with the cluster RNTI, the affected fields (which are predetermined and known a priori by the devices 10-1 through 10-4) are re-interpreted according to these teachings; otherwise those same fields are interpreted as is conventional for LTE. Specific for LTE, the affected fields subject to this re-interpretation are in an exemplary embodiment related to the second codeword in DCI Format 2A of PDCCH, such as for example a 'modulation and coding scheme' field of the second codeword, a 'number of spatial layers' field of the second codeword, and a 'precoding information' field of the second codeword. Other fields of different cellular system messages can be similarly designated for these re-interpretation purposes. The bit value within these fields, as re-interpreted, can be used for indicating an offset value that can be used to derive other PUCCH resource(s) not unlike the index values above in the first embodiment. Note also that the aforementioned fields of the DCI message could also be used to indicate the additional resources for ACK/NACK information directly rather than by offsetting, for example by mapping from the PUSCH region.

Each device may be considered in this second embodiment to have a position in the cluster, all except one of those positions corresponding to one of these re-interpreted fields. If we assume for simplicity that the cluster head does not have a corresponding field, its 'position' within the cluster is equivalent to j=0 of the first embodiment and it maps PDCCH→PUCCH as is normal for LTE, offsetting none since there is no corresponding field to tell it how much or what direction to offset. This is the position above with no corresponding DCI field. The second device 10-2 holds a position that corresponds to the 'modulation and coding scheme' field of the PDCCH 15, which for convenience we can consider is equivalent to position j=1 of the first embodiment. This second device 10-2 finds its assigned PUCCH 15-2UL by a) determining a first PUCCH by mapping PDCCH→PUCCH under normal LTE rules, and then b) offsetting PUCCH from that first PUCCH in an amount given by the bit value in the 'modulation and coding scheme' field. The third device 10-3 holds a position that corresponds to the 'number of spatial layers' field of the PDCCH 15, which for convenience we can consider is equivalent to position j=2 of the first embodiment. This third device 10-3 finds its assigned PUCCH 15-3UL by a) determining a first PUCCH by mapping PDCCH→PUCCH under normal LTE rules, and then b) offsetting PUCCH from that first PUCCH in an amount given by the bit value in the 'number of spatial layers' field. And similarly the fourth device 10-4 holds a position that corresponds to the 'precoding information' field of the PDCCH 15, which for convenience we can consider is equivalent to position j=3 of the first embodiment. This fourth device 10-4 finds its assigned PUCCH 15-2UL by a) determining a first PUCCH by mapping PDCCH→PUCCH under normal LTE rules, and then b) offsetting PUCCH from that first PUCCH in an amount given by the bit value in the 'precoding information' field. The above DCI fields may be associated to different positions in other embodiments.

Of course, mapping by the re-interpreted DCI fields need not be simply offsetting from the first PUCCH found by normal LTE mapping from the PDCCH 15, but this implementation is practical at least in LTE for the collision avoidance reasons noted above. If the D2D cluster has on-going communication and resource allocation on certain PUSCH resources, the aforementioned fields of the DCI message could in another embodiment indicate the usage of the allocated PUSCH resources for ACK/NACK response transmission to the eNB 12. This also implicitly triggers a transmission gap for the D2D communication among devices to allow devices 10-1 to 10-4 to send their ACK/NACK information to the eNB 12.

As noted above, the positions of the various D2D devices may be allocated by the cluster head or master device 10-1, and the master or cluster head device 10-1 is responsible for scheduling PUCCH transmissions among D2D devices on the assigned limited PUCCH resources for enhanced HARQ ACK/NACK, CQI or SR. By example this allocation of positions may be a semi-static PUCCH resource allocation for the devices in the D2D cluster in which usage within the D2D cluster is decided by the cluster head device 10-1 itself and informed to the eNB 12. In another example, the cluster head device 10-1 may dynamically schedule the allocated positions, and therefore the PUCCH transmissions, among the various other devices 10-2,10-3, 10-4, subject to a best possible operation and performance.

In an exemplary embodiment the cluster head device 10-1 may schedule another device 10-2, 10-3, 10-4 in the D2D group to send on one or more than one PUCCH resources simultaneously. In this case the cluster head is the one scheduling k units of PUCCH resources for other devices in the cluster, and any individual scheduled device may be allocated multiple positions (multiple j indices or multiple re-interpreted DCI fields for example). By example, this may be useful for the scheduled devices to send extended cooperative CQI reports or scheduling requests. In case more than a certain threshold L (1<L<=k) PUCCH resources are scheduled simultaneously from the D2D group, in an embodiment that implicitly signals to the eNB that some pre-arranged and specified smart redundancy or combining or content distribution schemes are being applied.

In this implicit signaling embodiment, by example when at least L PUCCHs are send in the same system frame from the cluster using some cooperation among the clustered devices of which the eNB is aware, the smart redundancy or combining may be implemented as enhanced cooperative error-correcting, joint coding, or delivery of enhanced control messages or content over the L PUCCHs. Additionally or alternatively, one device of the cluster may also be scheduled to send information on more than one allocated PUCCH resource, on behalf of the cluster. In this manner the one device may be considered as virtually taking several positions (e.g., indices or DCI fields). Also, one device may be scheduled to send just one cooperative or collective HARQ NACK for the cluster, whereas another device may send just enhanced CQI of the cluster and still a further device can send enhanced scheduling requests for the cluster. Such smart redundancy and/or smart combining can be helpful to the overall operation of the cluster while distributing the limited battery power used to collect, report and disperse such information across different devices in the cluster.

The D2D devices 10-1 to 10-4 can use the assigned PUCCH resources in a number of ways. By example the devices may use their mapped PUCCH resources to send enhanced HARQ ACK/NACK, CQI or SR specific to the D2D communications. Specific examples of the UL signaling include but are not limited to the following.

- If one PUCCH is assigned to a cluster of D2D devices then it may be specified that devices only use NACK based signaling (or other common signaling region) and only NACK is transmitted.
- In current LTE E-UTRAN, CQI sent on PUCCH from a regular/cellular UE is CQI of the downlink. However, as D2D communication may be deployed using spectrum band or resources of the uplink, it may be specified that CQI sent on the assigned PUCCH resources of the D2D group are of the D2D links on allocated radio resources.
- Furthermore, in addition to or instead of sending a response, request or indication of individual user devices on the PUCCH, a combined or collective response, request or indication of the D2D group/cluster or a certain cooperative subset thereof can be formed and sent on the assigned PUCCH resource(s).

One technical effect of these teachings is that they provide a method of enhancing PUCCH resources for efficient D2D support, while largely maintaining the existing E-UTRAN PUCCH structure. Another technical effect is that these teachings provide new HARQ ACK/NACK procedures to enable robust control plane message exchange between the serving network 12 and the individual devices 10-1 to 10-4 of the D2D cluster.

Figure 4:
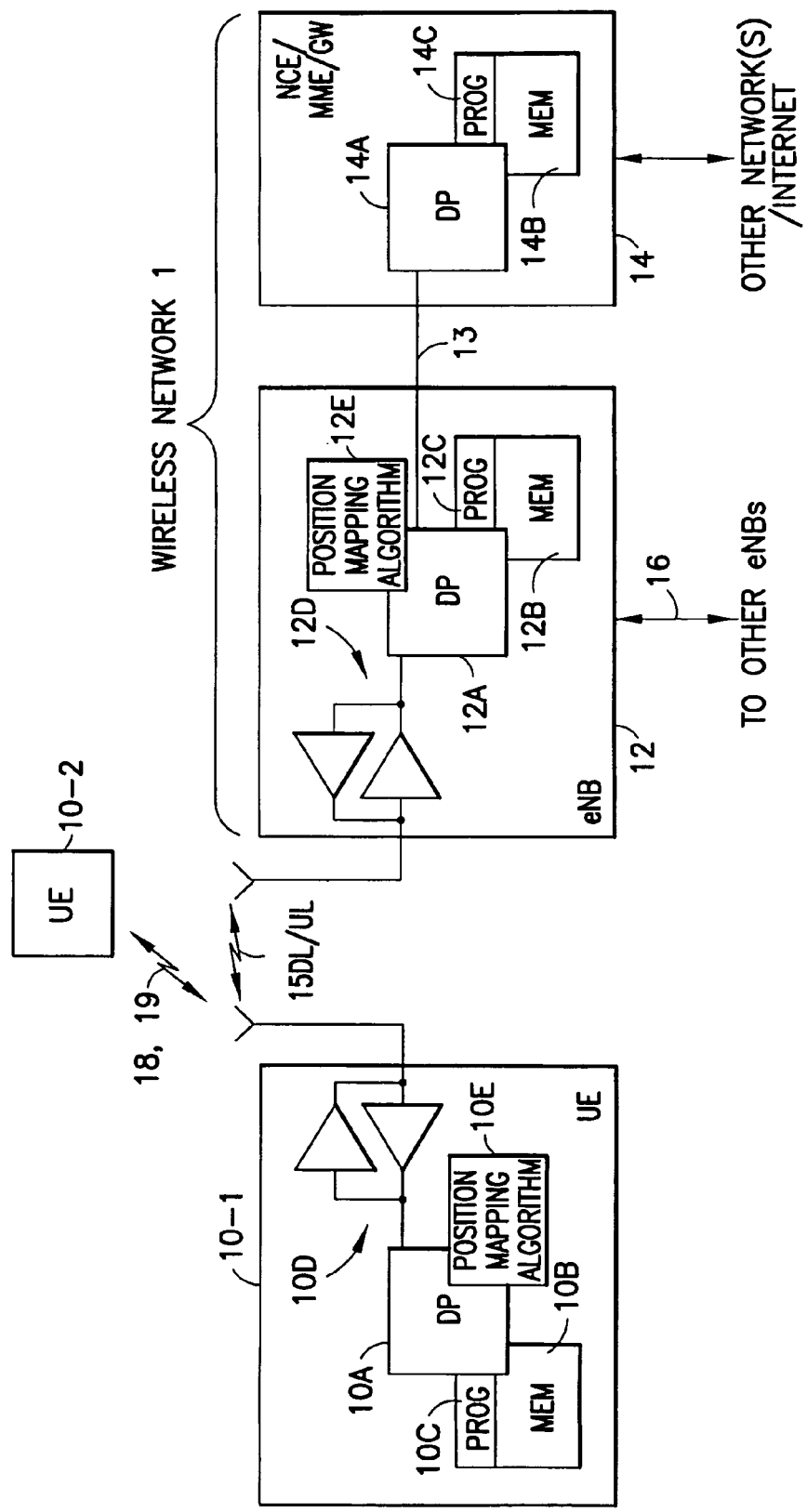
FIG. 4 shows a simplified block diagram of various electronic devices that are suitable for use in practicing the exemplary embodiments of this invention.
Figure 5B:
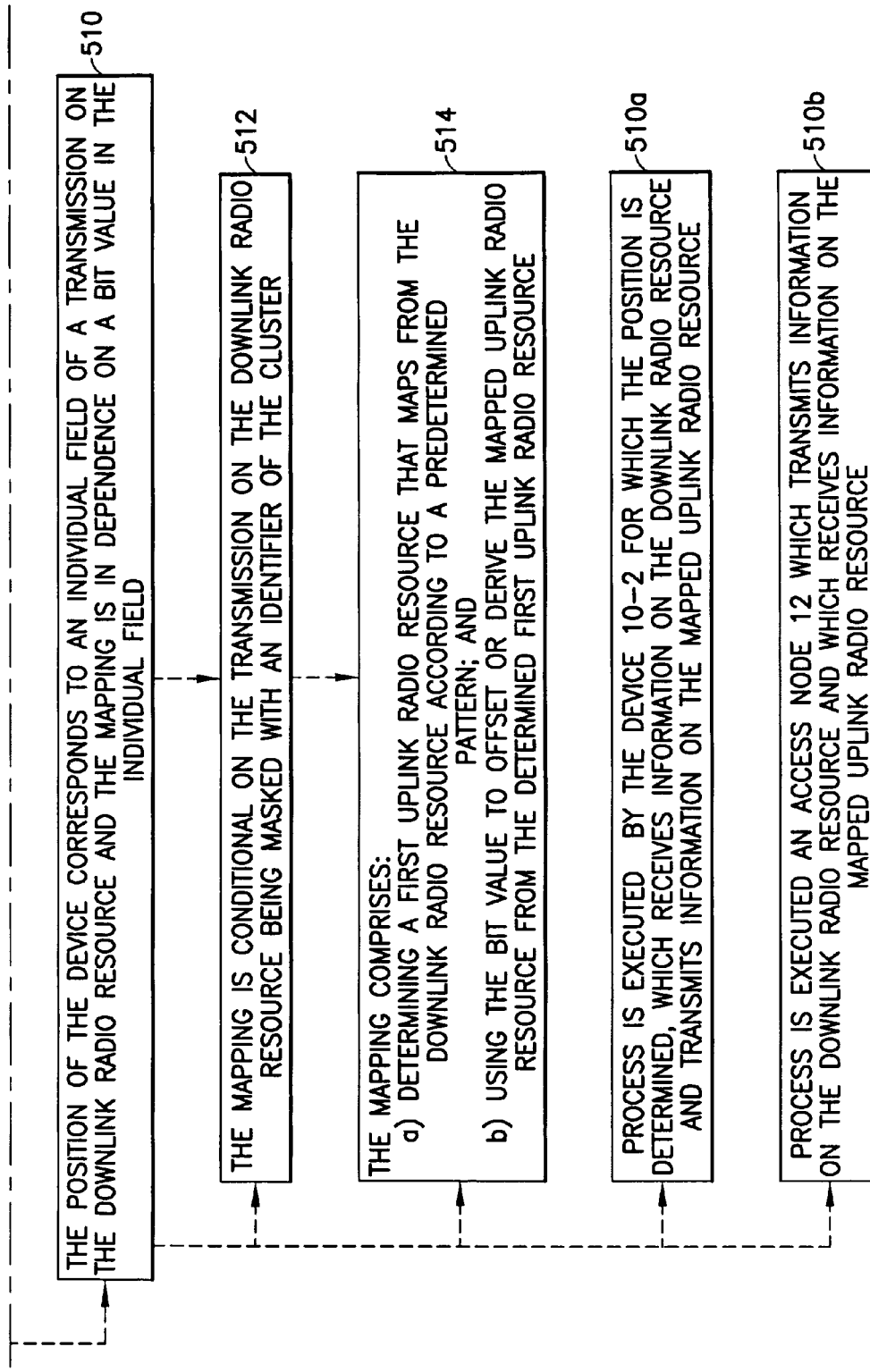
FIG. 5 is a logic flow diagram that illustrates, in accordance with an exemplary embodiment of this invention, the operation of a method, and a result of execution of computer program instructions embodied on a computer readable memory showing procedures before local communication may take place.

Before detailing the process flow diagram of FIG. 5, now are detailed at FIG. 4 a simplified block diagram of various electronic devices and apparatus that are suitable for use in practicing the exemplary embodiments of this invention. In FIG. 4 a wireless network 1 is adapted for communication over a bi-directional wireless link 15DL/UL with an apparatus, such as a mobile communication device which may be referred to as a UE 10-1, via a network access node, such as a Node B (base station), and more specifically an eNB 12. The network 1 may include a network control element (NCE) 14 which provides connectivity with a further network such as a telephone network and/or a data communications network (e.g., the internet). The NCE 14 may also be referred to as a mobility management entity MME and/or a gateway GW. The UE 10-1 of FIG. 4 is in the position of the local D2D cluster head device 10-1 shown at FIGS. 1-2, and the D2D links 18, 19 are with a second UE 10-2 which may be constructed similar as the first UE 10-1 and which is in a position of the second D2D device 10-2 of FIGS. 1-2.

The UE 10-1 includes a controller, such as a computer or a data processor (DP) 10A, a computer-readable memory medium embodied as a memory (MEM) 10B that stores a program of computer instructions (PROG) 10C, and a suitable radio frequency (RF) transmitter and receiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transmitter and receiver 12D for communication with the UE 10-1 via one or more antennas. The eNB 12 is coupled via a data/control path 13 such as an S1 interface to the NCE 14. The eNB 12 may also be coupled to another eNB via data/control path 16, which may be implemented as an X2 interface.

At least one of the PROGs 10C and 12C is assumed to include program instructions that, when executed by the associated DP, enable the device 10-1, 10-2, 12 to operate in accordance with the exemplary embodiments of this invention, as detailed above.

That is, the exemplary embodiments of this invention may be implemented at least in part by computer software executable by the DP 10A of the UE 10-1 (and/or 10-2) and/or by the DP 12A of the eNB 12, or by hardware, or by a combination of software and hardware (and firmware).

For the purposes of describing the exemplary embodiments of this invention the UE 10-1 may be assumed to also include a D2D cluster position mapping algorithm 10E which operates to store the device's 10-1 determined D2D cluster position and to adapt DL to UL channel mapping according to the stored and determined position, and to cause the transmitter 10D of the UE 10-1 to tune to the appropriately mapped channel at the appropriate times, as detailed above and as further detailed at FIG. 5 below. A similar position mapping algorithm 12E at the eNB 12 uses the positions of the devices 10-1, 10-2 stored in the eNB's MEM 10C to map received PUCCHs to determine which UE sent them.

In general, the various embodiments of the UEs 10-1, 10-2 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

FIG. 5 is a logic flow diagram that illustrates, in accordance with various exemplary embodiments of the invention, the operation of a method, and a result of execution of computer program instructions embodied on a computer readable memory, and an apparatus controlled by a processor running computer instructions stored on a memory. FIG. 5 illustrates variously from the perspective of the D2D device/UE 10-1, 10-2 and also from the perspective of the eNB 12.

At block 502 there is determined a position of a device within a cluster of multiple devices. In an embodiment the determined position is stored in a computer readable memory. At block 504 an uplink radio resource is mapped from a downlink radio resource in dependence on the determined position of the device within the cluster of multiple devices. Further elements of FIG. 5 are optional and particular implementations as detailed above.

Block 506 details an embodiment in which the UL radio resource is a PUCCH of a cellular network, the DL radio resource is a PDCCH of the cellular network, and the cluster of multiple devices communicate directly amongst themselves in a D2D network operating under control of the cellular network.

Block 508 relates to the first embodiment above; there are k uplink radio resources assigned to the cluster which are mapped by the multiple devices from the downlink radio resource, where k is an integer greater than one and is indexed as j=[0, 1, . . . k−1], and the position of the device is j≠0 and the mapping comprises: a) determining a first uplink radio resource that maps from the downlink radio resource according to a predetermined pattern for j=0; and b) using the j≠0 position of the device to offset or derive the mapped uplink radio resource from the determined first uplink radio resource.

At block 508a, the process of FIG. 5 through block 508 is executed by the device for which the position is determined, and this device 10-2 receives information on the downlink radio resource and transmits information on the mapped uplink radio resource.

At block 508b, the process of FIG. 5 through block 508 is executed an access node 12 which transmits information on the downlink radio resource and which receives information on the mapped uplink radio resource.

Block 510 relates to the second embodiment above; the position of the device corresponds to an individual field of a transmission on the downlink radio resource and the mapping is in dependence on a bit value in the individual field. Further detail at block 512 is that the mapping is conditional on the transmission on the downlink radio resource being masked with an identifier of the cluster. In this case, that the mapping is conditional is proved by another transmission on the downlink radio resource which is not masked with the identifier of the cluster, and for this another transmission the individual field is interpreted for a purpose other than mapping to any uplink radio resource, such as the examples above in which it is interpreted as any of: modulation and coding scheme; number of spatial layers, and precoding information.

Block 514 gives additional detail from block 510 and details that the mapping comprises: a) determining a first uplink radio resource that maps from the downlink radio resource according to a predetermined pattern; and b) using the bit value to offset or derive the mapped uplink radio resource from the determined first uplink radio resource.

At block 510a, the process of FIG. 5 through block 510 and optionally also through block 514 is executed by the device 10-2 for which the position is determined and which receives information on the downlink radio resource and which transmits information on the mapped uplink radio resource.

At block 510b, the process of FIG. 5 through block 510 and optionally also through block 514 is executed by an access node 12 which transmits information on the downlink radio resource and which receives information on the mapped uplink radio resource.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIG. 5 may be viewed as method steps, and/or as operations that result from operation of computer program code, and/or as a plurality of coupled logic circuit elements constructed to carry out the associated function(s). At least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

What is claimed is:

1. A method, comprising:
   determining position of a device within a cluster of multiple devices and storing the determined position in a computer readable memory, wherein the cluster of multiple devices communicate directly amongst themselves in a D2D network operating under control of a cellular network and includes a cluster head that receives the downlink radio resource from the cellular network and informs the device of the determined position of the device within the cluster via D2D signaling, the cluster head informing the cellular network of the uplink radio resource to be associated with the device; and
   mapping an uplink radio resource from a downlink radio resource in dependence on the determined position of the device within the cluster of multiple devices so that uplink control resources for communicating with the cellular network are assigned for the device also in direct D2D communication with at least one other device in the D2D network.

2. The method according to claim 1, in which the uplink radio resource is a physical uplink control channel of the cellular network, the downlink radio resource is a physical downlink control channel of the cellular network.

3. The method according to claim 1, in which there are k uplink radio resources assigned to the cluster which are mapped by the multiple devices from the downlink radio resource, where k is an integer greater than one and is indexed as j=[0, 1, ... k−1];
   in which the position of the device is j≠0 and the mapping comprises:
      determining a first uplink radio resource that maps from the downlink radio resource according to a predetermined pattern for j=0; and
      using the j≠0 position of the device to offset or derive the mapped uplink radio resource from the determined first uplink radio resource.

4. The method according to claim 3, executed by the device for which the position is determined and which receives information on the downlink radio resource and which transmits information on the mapped uplink radio resource.

5. The method according to claim 3, executed by an access node which transmits information on the downlink radio resource and which receives information on the mapped uplink radio resource.

6. The method according to claim 1, in which the position of the device corresponds to an individual field of a transmission on the downlink radio resource and the mapping is in dependence on a bit value in the individual field.

7. The method according to claim 6, in which the mapping is conditional on the transmission on the downlink radio resource being masked with an identifier of the cluster;
   and for the case in which another transmission on the downlink radio resource is not masked with the identifier of the cluster the individual field is interpreted for a purpose other than mapping to any uplink radio resource.

8. The method according to claim 6, executed by the device for which the position is determined and which receives information on the downlink radio resource and which transmits information on the mapped uplink radio resource.

9. The method according to claim 6, executed by an access node which transmits information on the downlink radio resource and which receives information on the mapped uplink radio resource.

10. A memory storing a program of computer readable instructions that when executed by at least one processor result in actions comprising:
    determining position of a device within a cluster of multiple devices, wherein the cluster of multiple devices communicate directly amongst themselves in a D2D network operating under control of a cellular network and includes a cluster head that receives the downlink radio resource from the cellular network and informs the device of the determined position of the device within the cluster via D2D signaling, the cluster head informing the cellular network of the uplink radio resource to be associated with the device; and mapping an uplink radio resource from a downlink radio resource in dependence on the determined position of the device within the cluster of multiple devices so that uplink control resources for communicating with the cellular network are assigned for the device also in direct D2D communication with at least one other device in the D2D network.

11. The memory according to claim 10, in which there are k uplink radio resources assigned to the cluster which are mapped by the multiple devices from the downlink radio resource, where k is an integer greater than one and is indexed as j=[0, 1, ... k−1];

in which the position of the device is j≠0 and the mapping comprises:
determining a first uplink radio resource that maps from the downlink radio resource according to a predetermined pattern for j=0; and
using the j≠0 position of the device to offset or derive the mapped uplink radio resource from the determined first uplink radio resource.

12. The memory according to claim 10, in which the position of the device corresponds to an individual field of a transmission on the downlink radio resource and the mapping is in dependence on a bit value in the individual field.

13. An apparatus, comprising:
at least one processor; and
at least one memory storing computer program code;
the at least one memory and the computer program code configured, with the at least one processor, to cause the apparatus at least to:
determine position of a device within a cluster of multiple devices, wherein the cluster of multiple devices communicate directly amongst themselves in a D2D network operating under control of a cellular network and includes a cluster head that receives the downlink radio resource from the cellular network and informs the device of the determined position of the device within the cluster via D2D signaling, the cluster head informing the cellular network of the uplink radio resource to be associated with the device; and
map an uplink radio resource from a downlink radio resource in dependence on the determined position of the device within the cluster of multiple devices so that uplink control resources for communicating with the cellular network are assigned for the device also in direct D2D communication with at least one other device in the D2D network.

14. The apparatus according to claim 13, in which there are k uplink radio resources assigned to the cluster which are mapped by the multiple devices from the downlink radio resource, where k is an integer greater than one and is indexed as j=[0, 1, ... k−1];

in which the position of the device is j≠0, and the at least one memory and the computer program code are configured with the at least one processor to cause the apparatus to map the uplink radio resource from the downlink radio resource by at least:
determining a first uplink radio resource that maps from the downlink radio resource according to a predetermined pattern for j=0; and
using the j≠0 position of the device to offset or derive the mapped uplink radio resource from the determined first uplink radio resource.

15. The apparatus according to claim 14, in which the value of k is signaled to at least the cluster head.

16. The apparatus according to claim 14, in which the apparatus comprises the device for which the position is determined and which receives information on the downlink radio resource and which transmits information on the mapped uplink radio resource.

17. The apparatus according to claim 14, in which the apparatus comprises an access node which transmits information on the downlink radio resource and which receives information on the mapped uplink radio resource.

18. The apparatus according to claim 13, in which the position of the device corresponds to an individual field of a transmission on the downlink radio resource;

and the at least one memory and the computer program code are configured with the at least one processor to map the uplink radio resource from the downlink radio resource in dependence on a bit value in the individual field.

19. The apparatus according to claim 18, in which the purpose other than mapping comprises any of: modulation and coding scheme; number of spatial layers, and precoding information.

20. The apparatus according to claim 18, in which the at least one memory and the computer program code are configured with the at least one processor to cause the apparatus to map the uplink radio resource from the downlink radio resource by at least:
determining a first uplink radio resource that maps from the downlink radio resource according to a predetermined pattern; and
using the bit value to offset or derive the mapped uplink radio resource from the determined first uplink radio resource.

* * * * *